United States Patent Office  3,010,710
Patented Nov. 28, 1961

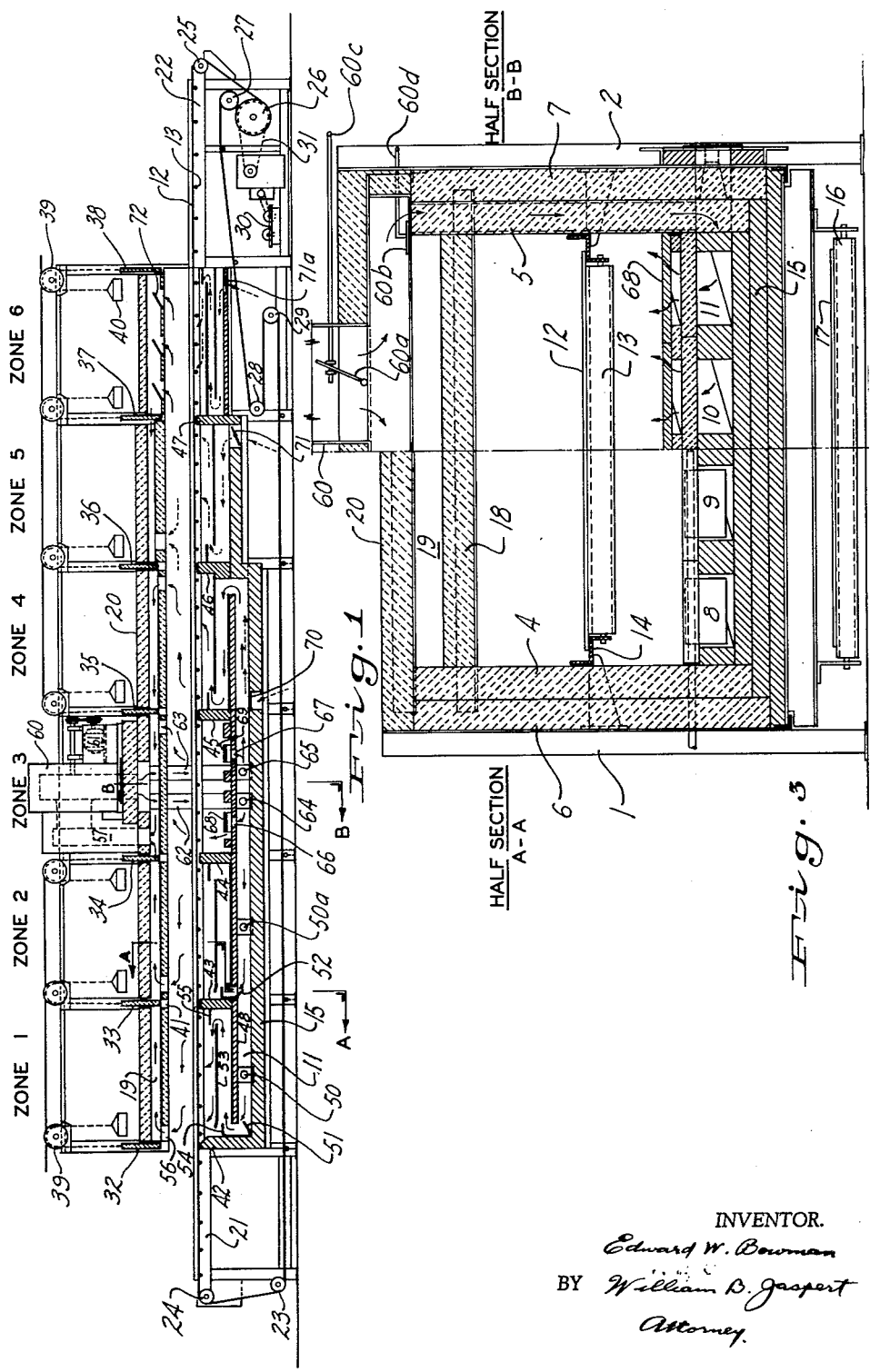

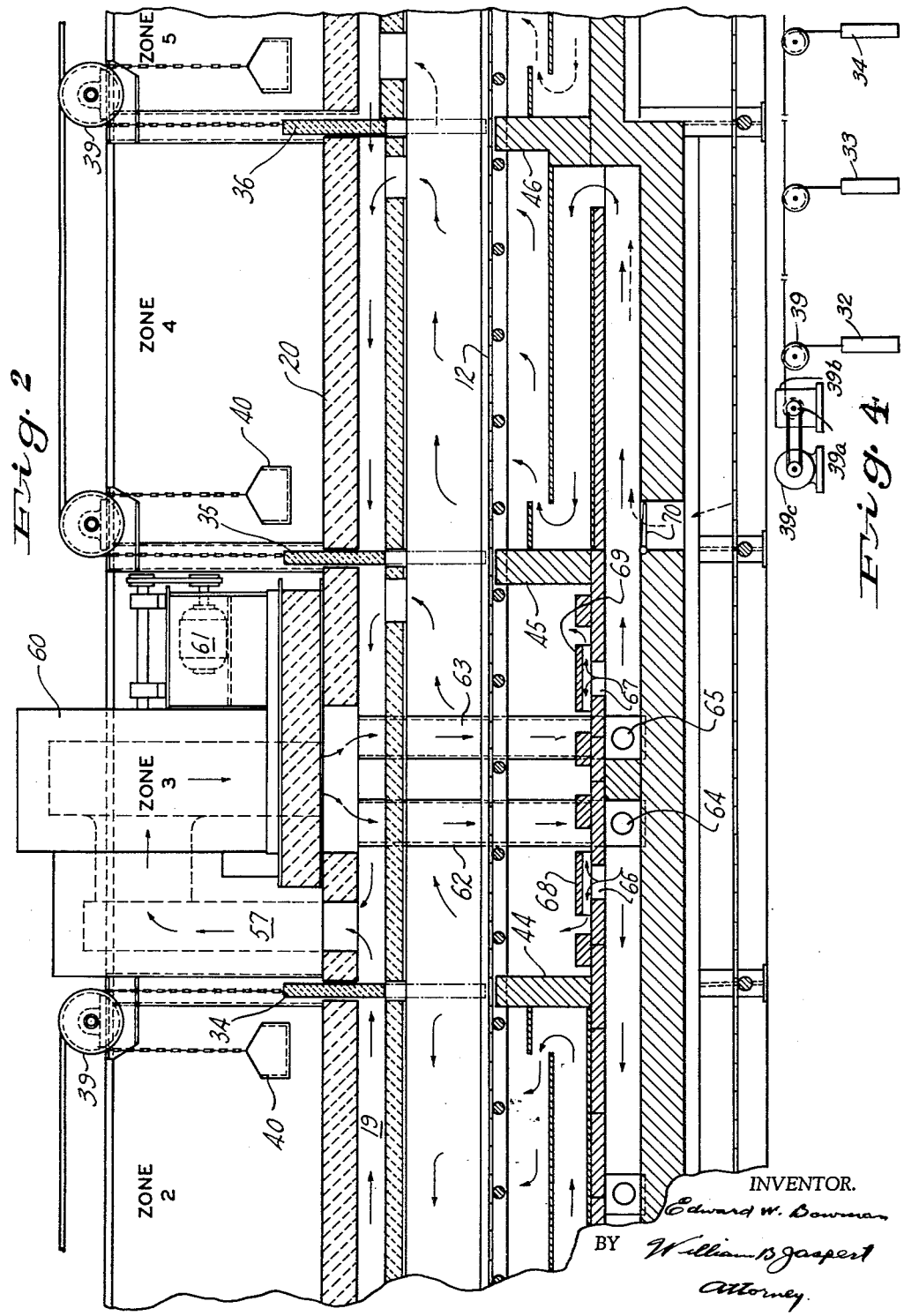

3,010,710
ANNEALING, HEATING AND PROCESSING FURNACE
Edward W. Bowman, 777 Lockhart St., Washington, Pa.
Filed June 24, 1957, Ser. No. 667,321
6 Claims. (Cl. 263—8)

This invention relates to new and useful improvements in industrial heating furnaces, more particularly to furnaces requiring the application of heat in successive zones in a manner to control the temperature of said zones for preheating, heating and successively cooling or tempering the articles being treated.

It is among the objects of the invention to provide heating furnaces in which the articles to be treated are conveyed by continuous conveyors from a charge to a discharge end through the successive heating and treating zones.

It is a further object of the invention to provide a continuous tunnel type of furnace employing an endless conveyor belt or the like, in which the heating zones are established by the use of baffle plates and doors or movable partition elements extending from the roof of the tunnel to the conveyor belt which are simultaneously raised and lowered in timed cycles in accordance with the particular treatments to which the ware is subjected.

It is still a further object of the invention to provide a furnace of the above-designated type in which the movements of conveying element is synchronized with the raising and lowering of the zoning doors so that the ware is transferred from zone to zone when the partition doors are in their elevated position.

It is yet another object of the invention to provide industrial heating furances in which the successive heating and cooling zones may be fired or cooled by the use of burners, dampers and exhaust flues to maintain a desired predetermined heating or cooling temperature in each zone.

It is a further object of the invention to provide an industrial heating furnace divided into heating and cooling zones in which the hot air is delivered from a heating flue through damper controlled openings into tempering chambers divided by flue plates so that when the air passes into the treating or cooling chamber, it is preconditioned to a desired temperature.

It is a further object of the invention to provide industrial heating furnaces in which the heated air and products of combustion are withdrawn from the heating zones through exit flues and recirculated by means of a heat fan and motor to deliver the preheated air to the firing flues below the heating zones of the furnace.

It is a further object of the invention to provide cooling flues below the cooling zones of the furnace in which the cooling air is passed between preheated flue plates to temper it so that it does not have any adverse effect on the hot ware entering the cooling chambers.

These and other objects of the invention will become more apparent from a consideration of the accompanying drawings constituting a part hereof in which like reference characters designate like parts and in which:

FIGURE 1 is a vertical cross-sectional view, partially in elevation taken longitudinally of a furnace embodying the principles of this invention;

FIGURE 2 is a similar view of an enlarged detail at substantially the longitudinal center of the furnace;

FIGURE 3 is a vertical transverse section consisting of two half sections, one of which is taken along the line A—A of FIGURE 1 and the other section being taken along the line B—B of FIGURE 1, the half sections A—A and B—B are so designated in FIGURE 3 of the drawings;

FIGURE 4 is a diagrammatic view of the door suspension and motor drive therefor.

As shown in FIGURE 3, the furnace is supported by buckstays 1 and 2 and consists of inner refractory walls 4 and 5 with outer insulating walls 6 and 7. A series of flues designated by the numerals 8, 9, 10 and 11 are provided beneath the furnace hearth which, in this case, consists of an endless conveyor 12 such as a wire mesh conveyor that is supported on rollers 13 mounted on angle brackets 14 inside of the furnace chamber.

The bottom flues of the furnace are provided with refractory bottoms and insulating layers generally designated by the numeral 15 and a series of rollers 16 support the return strand 17 of the endless conveyor. The upper part of the heating furnace is provided with a roof designated by the numeral 18 above which is a flue 19 and a cover or top wall 20. The flue 19 constitutes the return flue for the products of combustion and the hot air and, as will be hereinafter described in connection with the other figures of the drawing. Return flue 19 is connected with a fan and motor for recirculation to the heating and cooling flues.

With reference to FIGURES 1 and 2 of the drawing, the front of the heating furnace is provided with a charging table 21 and the rear of the furnace with a discharge table 22, the endless conveyor 12 passing from the bottom over guide pulley 23 to a pulley or drum 24 that guides the belt over the charging table into the furnace chamber. Similarly, the conveyor 12 leaves the discharge table over a drum 25 from which it passes to a drive drum 26 and guide roll 27 and take-up rolls 28 and 29, hence over the return rollers 16 to the charging end of the furnace. The endless conveyor drum 26 is driven through a gear transmission mechanism 30 by a drive chain 31.

The division of the heating chamber of the furnace into zones is best illustrated in FIGURE 1, wherein a plurality of gates or insulated doors 32, 33, 34, 35, 36, 37 and 38 are mounted on drums 39, the doors having counterweights 40, as illustrated in conjunction with the door 38 on the discharge end. The respective doors pass through slots or openings 41 in the roof 18 of the furnace chambers and also through slots in the covers 20 as shown, and in their lowered position, the tops of the doors are below flue passage 19.

The heating and cooling flues are also divided into partions by the end wall 42 and the partition walls 43, 44, 45, 46 and 47, the latter registering with the doors 33, 34, 35, 36 and 37 respectively. When the doors are lowered, the furnace is divided into separate zones, as shown by the dash lines in FIGURE 2.

The heating end of the furnace is provided with flue tile 48 which forms the heating flues 8, 9, 10 and 11 and in which are located the burners 50, 50a, etc. Dampers 51 and 52 are provided to control the volume of the products of combustion passing into the chamber above the flue wall 48. Also the dampers 51 and 52 may be employed to direct the flow of the products of combustion; namely, if damper 52 is closed, the heat from the first two burners would all pass through the opening controlled by damper 51 into the front or zone one of the furnace.

Above the flue tile 48 are disposed flue plates 53 which have baffled ends 54 and 55 to form restricted openings, similar elements being employed in other zones of the furnace.

The products of combustion leaving the respective zones pass through openings 56 into the return flue 19 from which they pass to the flue 57 that delivers the hot products of combustion to the heat fan 60 that is driven by motor 61. The heat fan recirculates the hot air through the vertical flues 62 and 63 and returns it to the bottom heating flues 10 and 11 by operating adjustable dampers 60a and 60b through rods 60c and 60d.

Directly beneath the recirculating flues 62 and 63, the heating flues 10 and 11 are provided with burners 64 and 65 and the flue tile 48 is provided with openings 66 and 67 which are baffled by tile 68 and 69, respectively.

A cold air inlet with damper 70 is provided and a second cold air inlet with damper 71 is provided in successive cooling zones on the right side of the recirculating central portion of the furnace. The roof of the end zone is provided with a series of adjustable dampers or louvers 72 to effect a more rapid cooling by permitting the air from the end zone of the furnace to return through flue 19 after it is tempered by the baffling, as shown.

For convenience of description, the zones have been numbered from 1 to 6, as shown. The doors are mounted to be operated simultaneously, as shown in FIGURE 4.

As shown in FIGURE 4, the drums 39 are simultaneously rotated by a chain or cable connection with a drive pulley 39a of the transmission 39b operated by motor 39c.

The construction of the furnace chamber with the partitioned heating and cooling flues therebeneath, and the dividing doors or gates with the return flue and recirculating flues indicate the mode of heat application, cooling air application and the controls therefor, so that it is only necessary to explain that the furnace is operated by a controlled cycle determined by a conventional time clock that operates the gate motor.

Some examples of the use of the furnace will demonstrate its versatility from a standpoint of applying controlled temperatures for heating products and cooling same as they pass from zone to zone for successive processing in its travel by the endless conveyor which is arranged, in any desired conventional manner, to function intermittently in timed relation with the operation of the doors of the successive zones.

The following is an example of how the furnace may be used for glass bending and as a decorating lehr. The ware is placed on the conveyor at the charging table and is passed into zone 1. The partition doors or gates 32, 33, 34, 35, 36, 37 and 38 close when the conveyor has come to a stop at the end of its five-foot travel which is the assumed distance of the zone between the doors of the furnace. While the ware is retained in zone 1 for a predetermined period, say ten minutes, it is preheated to a temperature of 350° F. At the end of the preheating period, the gates raise and the conveyor starts to move the preheated ware into zone 2. The conveyor then stops and the gates 32 through 38 lower and the ware is further preheated to a temperature of 850° F. in zone 2. At the same time, of course, a new charge of glass ware has been delivered into zone 1. As is evident, the temperature of 350° F. is obtained in zone 1 by regulating the burners 50, 50a and 64 and the damper 51. Similarly, the preheating temperature of 850° F. is maintained in zone 2 by regulating the second burner 50a, 64 and the damper 52.

At the end of the treating cycle, the gates 32 through 38 again raise and the conveyor 12 moves the ware from zone 2 to zone 3 and delivers the ware from zone 1 to zone 2 and a new charge on the charging table to zone 1. When the conveyor stops and the gates are lowered, the preheated ware is bent and decorated at approximately 1100° F. in zone 3 while the ware in zones 1 and 2 is preheated as described. When the gates again raise and the conveyor moves the ware to the rear of the furnace from zone 3 to zone 4, it is subject to a controlled annealing from 1100° F. to 880° F. and subsequently in zone 5 it is cooled from 880° F. to approximately 400° F. and finally in zone 6, it is cooled from 400° F. to room temperature after which it is delivered to the discharge table 22 from which it is removed.

After the ware enters zone 4, cold air is drawn through opening 70 into the flue and through the baffle plates into zone 4, it being noted that the burner 65 controls the temperature of the air by mingling with the cold air entering the cold air inlet 70 so that when the air passes into the chamber of zone 4 it has been tempered and is suitable for contact with the ware in that zone.

Attention is directed to the solid arrows on the left side of the heating furnace, and the dash arrows on the right side, the solid arrows indicating hot air or products of combustion, while the dash arrows designate cold air that enters the respective flues. The same is true in the heating chambers, as indicated by the different arrows. In zone 6, all of the air entering from below through the damper 71a is delivered as cold air into the chamber of zone 6 and the hot air strata at the top of the chamber passes out through the louvered openings 72 to flue 19.

All of the above steps, when applied to bending double strength window glass, would consume about 48 minutes where currently, by present furnace use, it is done in two hours or more. Also, the quality of decorating as well as the quality of anneal will be equal to or better than equipment twice the length of the present design of furnace. This is due to the fact that zonal control and the use of bottom baffling to temper incoming hot and cold air is so controlled as to obtain the maximum capacity and usage from the furnace.

Another example of operation of the furnace may be given with reference to glass decorating but not bending. In this case, the cycle would be the same as for bending and decorating, but the glass would not be bent and would consequently be decorated at a somewhat lower temperature in zone 3.

If the furnace is used for china decorating, the first three zones on preheat and decorating function would be the same as in the glass bending and decorating operation with the temperatures of zones 2 and 3 slightly higher to accommodate china as against the glass. In that case, zones 4, 5 and 6 will all be operated as cooling cycles as the need for annealing in china does not exist to as serious extent as glassware, but all the advantages of speed and quality control would be present.

The furnace can be used for annealing only, in which case the heating of zone 1 would be eliminated. Of course the charging table could also be eliminated and the ware placed directly upon the conveyor. If used for straight annealing, the overall length of the lehr would not be more than 32 feet and only five zones would be involved. In the first zone the ware would be charged at temperatures from 400° F. to 600° F. and the glass would be raised to approximately 800° F. In the next zone the ware would be raised to annealing temperatures around 950° F. and then moved to a third zone where it would be lowered to the critical range to approximately 850° F. It would then be moved to the succeeding zone and cooled to approximately 400° and in the final zone to room temperature, from where it would be discharged to the end table and removed.

For general glass processing, the furnace may be used for air tempering by employing fewer zones. For example, if television tube parts were to be preheated prior to welding or fusing, the above method of processing would be ideally suitable because of the controls effected through the baffle zoning system, as described. Also, the furnace would be admirably suited for air quenching preheated glass ware to produce what is known as tempered glass, because accurate control of preheat is available. Here again fewer zones are required than in the bending and decorating operations previously explained.

The equipment, of course, may be employed as a general purpose kiln for firing glaze and frit on china because of the controlled zone firing the furnace could be greatly reduced in length, thereby reducing cost of stainless steel and other expensive materials commonly employed for this type of furnace.

Finally, the furnace is designed to give essential controls for the use of steel tempering and air drawing, and even for billet heating and soaking, which would require more substantial construction of the furnace parts and perhaps a greater number of burners.

By means of the above-described furnace, lehrs for use in treating glass ware as described, may be reduced in length approximately 50% of those which are currently employed. Also, by the intermittent stopping of the conveyor belt between the transfer of the material from zone to zone, the ware may be inspected while it is passing through the furnace without any time loss after it is delivered to the discharge table. By means of the controlled zone firing, the production rate per square foot of bulk area is approximately doubled and because of the relatively smaller furnace structure, cost of construction is greatly reduced.

It is evident from the above description of this invention that a furnace structure made in accordance therewith, provides economy of operation and great flexibility in its use for different purposes around glass and other industrial plants.

Although one embodiment of the invention has been herein illustrated and described, it will be evident to those skilled in the art that various modifications may be made in the details of construction without departing from the principles herein set forth.

I claim:

1. In an industrial heating furnace a tunnel type heating chamber extending longitudinally through the furnace said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber, a plurality of longitudinally spaced upstanding partitions extending above the bottom wall of the heating chamber to adjacent the ware bearing strand of the conveyor and a plurality of vertically movable partition doors adapted to extend from the top wall of said chamber transversely of the heating chamber in alignment with said upstanding partitions to the ware bearing strand of said conveyor dividing the tunnel chamber into a plurality of separately controllable heating zones, and burners in said heating flue below the bottom wall of said heating chamber, said heating flue having openings for directing the products of combustion to said heating zones and for admitting air to said flue, dampers for some of said openings, and flue plates in the space between the heating flue and ware bearing strand of the conveyor for directing and tempering the products of combustion passing into the heating zones.

2. In an industrial heating furnace a tunnel type heating chamber extending longitudinally through the furnace said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber, a plurality of longitudinally spaced upstanding partitions extending above the bottom wall of the heating chamber to adjacent the ware bearing strand of the conveyor and a plurality of vertically movable partition doors adapted to extend from the top wall of said chamber transversely of the heating chamber in alignment with said upstanding partitions to the ware bearing strand of said conveyor dividing the tunnel chamber into a plurality of separately controllable heating zones, and burners in said heating flue below the bottom wall of said heating chamber, said heating flue having openings for directing the products of combustion to said heating zones and for admitting air to said flue, dampers for some of said openings, and flue plates in the space between the heating flue and ware bearing strand of the conveyor for directing and tempering the products of combustion passing into the heating zones, said vent flue having inlet passages for venting the partitioned heating zones.

3. In an industrial heating furnace, a tunnel type heating chamber extending longitudinally through the furnace said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber, a plurality of longitudinally spaced upstanding partitions extending above the bottom wall of the heating chamber to adjacent the ware bearing strand of the conveyor and a plurality of vertically movable partition doors adapted to extend from the top wall of said chamber transversely of the heating chamber in alignment with said upstanding partitions to the ware bearing strand of said conveyor dividing the tunnel chamber into a plurality of separately controllable heating zones, and burners in said heating flue, below the bottom wall of said heating chamber, said heating flue having openings for directing the products of combustion to said heating zones and for admitting air to said flue, dampers for some of said openings, and flue plates in the space between the heating flue and ware bearing strand of the conveyor for directing and tempering the products of combustion passing into the heating zones, said vent flue having inlet passages for venting the partitioned heating zones and means for recirculating the hot gases from said vent flue to said heating flue.

4. In an industrial heating furnace a tunnel type heating chamber extending longitudinally through the furnace said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber, a plurality of longitudinally spaced upstanding partitions extending above the bottom wall of the heating chamber to adjacent the ware bearing strand of the conveyor and a plurality of vertically movable partition doors adapted to extend from the top wall of said chamber transversely of the heating chamber in alignment with said upstanding partitions to the ware bearing strand of said conveyor dividing the tunnel chamber into a plurality of separately controllable heating zones, said heating flue and tunnel chamber having openings for admitting air thereto and said vent flue having openings for exhausting the hot gases from said tunnel chamber, burners at longitudinally spaced intervals in said heating flue below the bottom wall of said heating chamber, means for admitting regulatable volumes of the products of combustion to said heating zones, and means including flue plates with baffled openings for tempering the hot gases passing to the ware in said zones, said tunnel chamber having passages for admitting cooling air to some of said zones.

5. In an industrial heating furnace a tunnel type heating chamber extending longitudinally through the furnace, said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber said heating flue extending partway of the tunnel chamber and the vent flue the full length of said chamber, said bottom wall of the tunnel chamber beyond the heating flue being of graduated thickness for cooling portions of said chamber, a plurality of longitudinally spaced upstanding partitions extending above the bottom wall of the heating chamber to adjacent the ware bearing strand of the conveyor and a plurality of vertically moveable partition doors adapted to extend from the top wall of said chamber transversely of the heating chamber in alignment with said upstanding partitions to the ware bearing strand of said conveyor dividing the tunnel chamber into a plurality of separately controllable heating zones.

6. In an industrial heating furnace a tunnel type heating chamber extending longitudinally through the furnace said chamber having top and bottom walls, an endless conveyor having its ware bearing strand within the tunnel chamber substantially mid-way of the vertical distance between said walls, a heating flue below the bottom wall of said heating chamber and a vent flue above the top wall of the heating chamber said heating flue extending partway of the tunnel chamber and the vent flue the full length of said chamber, said bottom wall of the tunnel chamber beyond the heating flue being of graduated thickness for cooling portions of said chamber, said cooling portion of said tunnel chamber having an air inlet in the bottom and louvered openings in the roof for rapidly exhausting the heat to the vent flue, a plurality of longitudinally spaced upstanding partitions extending above the bottom wall of the heating chamber to adjacent the ware bearing strand of the conveyor and a plurality of vertically movable partition doors adapted to extend from the top wall of said chamber transversely of the heating chamber in alignment with said upstanding partitions to the ware bearing strand of said conveyor dividing the tunnel chamber into a plurality of separately controllable heating zones.

References Cited in the file of this patent

UNITED STATES PATENTS

| | | |
|---|---|---|
| 890,251 | Thompson | June 9, 1908 |
| 1,994,220 | Hormel | Mar. 12, 1935 |
| 2,222,809 | Curran | Nov. 26, 1940 |
| 2,406,822 | Fox | Sept. 3, 1946 |
| 2,841,925 | McMaster | July 8, 1958 |